W. PRELLWITZ.
CHANNELING MACHINE.
APPLICATION FILED JAN. 4, 1907.
916,013.
Patented Mar. 23, 1909.
2 SHEETS—SHEET 1.
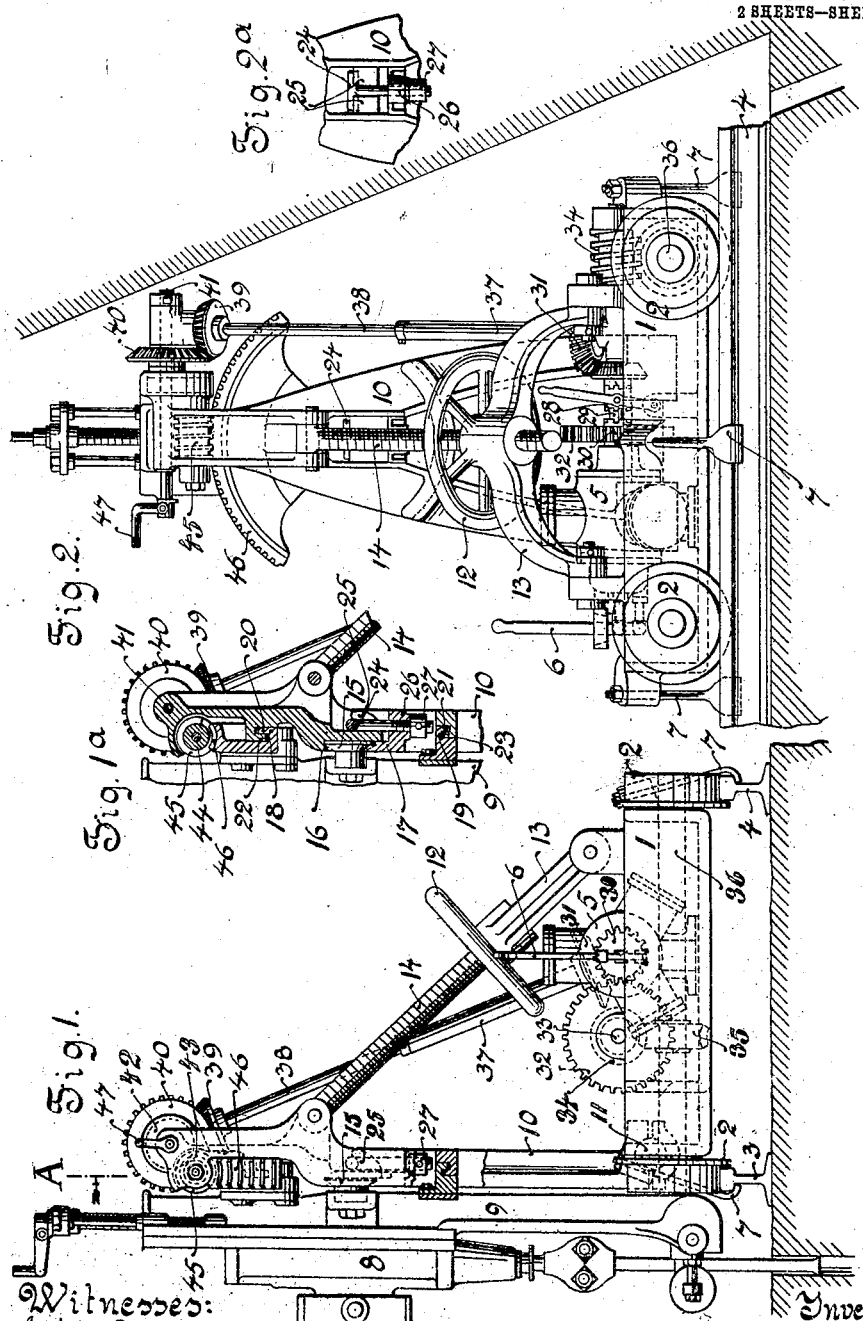

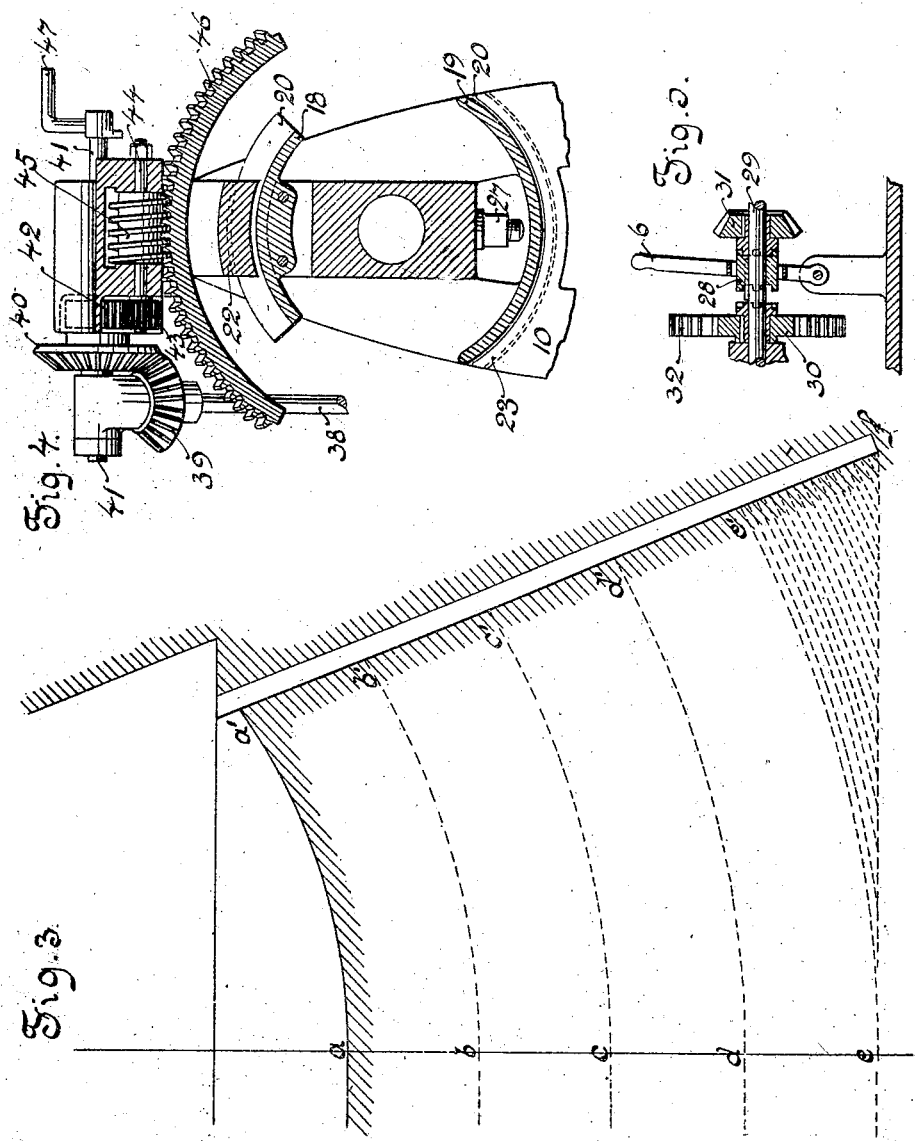

UNITED STATES PATENT OFFICE.

WILLIAM PRELLWITZ, OF EASTON, PENNSYLVANIA, ASSIGNOR TO INGERSOLL-RAND COMPANY, OF NEW YORK, N. Y., A CORPORATION OF NEW JERSEY.

CHANNELING-MACHINE.

No. 916,013.　　　Specification of Letters Patent.　　　Patented March 23, 1909.

Application filed January 4, 1907. Serial No. 350,736.

*To all whom it may concern:*

Be it known that I, WILLIAM PRELLWITZ, a citizen of the United States, and resident of Easton, in the county of Northampton and State of Pennsylvania, have invented a new and useful Improvement in Channeling-Machines, of which the following is a specification.

The object of my invention is to provide a channeling machine which is adapted for use as a straight line channeler and when it has cut a channel to a predetermined point, it is adapted for use as a radial channeler, whereby the drill tool may be caused to strike the rock at right angles thereto instead of at an acute angle as has heretofore been necessary when the transverse cuts have been made with a regular straight line channeler.

A further object of my invention is to provide certain improvements in the construction, form and arrangement of the several parts whereby a single motor is used for moving the channeler along the track to cut a channel to a predetermined point and then used for swinging the drill in the arc of a circle to cause the drill to complete the channel from said predetermined point.

In the accompanying drawings, Figure 1 represents the channeling machine in side elevation partially in section, Fig. 1ª is a detail section showing the manner of clamping the drill shell to and releasing it from the swinging truck frame, Fig. 2 is a view of the machine in back elevation, Fig. 2ª is a detail back view of the means for locking the drill shell to the truck frame, Fig. 3 is a detail view showing the manner in which the machine may be used both as a straight line and a radial channeler for completing a cut from one level to a lower level, Fig. 4 is a transverse vertical section taken in the plane of the line A of Fig. 1, looking in the direction of the arrow, and Fig. 5 is a detail view of the means for connecting the motor shaft to the truck drive or to the radial driving means of the drill.

The truck of the channeler is denoted by 1 and its traction wheels by 2. The track rails which are shown as laid along one level are denoted by 3 and 4. A motor 5 of any well known or approved form, in the present instance a three cylinder rotary engine, is shown as mounted on the truck 1 and it is arranged to drive the truck along the track when the machine is to be used as a straight line channeler and to swing the drill in the arc of a circle when the machine is to be used as a radial channeler. The motor 5 is herein shown as being provided with a hand operated reversing and controlling lever 6. The truck may be provided with the usual clamping irons 7 which are arranged to engage the heads of the track rails for locking the channeler to the rails when so desired.

The drill is denoted as a whole by 8 and it may be of any well known or approved form and is herein shown as of the fluid pressure controlled type. This drill is carried by a shell 9 which is arranged to be swung forwardly and rearwardly in the arc of a circle on the frame 10 which is hinged to the truck 1 at 11, to swing transversely thereof into different adjustments. This frame 10 may be adjusted to different angular positions with respect to the truck by means of the usual hand nut 12 carried by a swinging frame 13 hinged to the truck, which hand nut engages a screw bolt 14 hinged to the back of the frame 10 at its upper portion.

The shell 9 of the drill is pivoted to the truck frame 10 as follows. The shell is provided with a reverse cone 15 which is seated in a half recess 16 in the frame 10. The other half of the cone recess is formed in the end of a movable jaw 17 which is fitted to slide toward and away from the pivot cone 15. The shell is guided and supported by the frame 10 upon opposite sides of the pivot cone 15 by providing the shell with oppositely arranged upper and lower segments 18, 19, which are provided with lips 20, 21, located in concentric recesses 22, 23, in the frame 10. These upper and lower segments are bolted rigidly to the shell 9. The shell 9 is locked against movement when desired, by providing a bolt 24 the laterally projecting arms of which rest in sockets 25 in the frame 10 and the vertical portion of which bolt projects through a rearwardly extended arm 26 of the movable jaw 17. Below this arm 26, the bolt 24 is provided with a nut 27 for setting up the jaw 17 into snug engagement with the cone 15 and clamping it securely and rigidly to the frame.

A movable double clutch member 28 is located on the shaft 29 of the motor 5 and it is arranged to be engaged either with the gear 30 of the truck driving mechanism or the gear 31 of the drill swinging mechanism, for locking the said motor shaft to the one or the other of the said mechanisms. The truck driving mechanism comprises the gear 30 which meshes with a gear 32 on a shaft 33 having a worm 34 meshing with a gear 35 fixed on the axle 36 of one pair of truck wheels 2.

The mechanism for imparting a radial movement to the drill comprises the bevel gear 31 which is fixed to the lower section 37 of an extensible and contractible shaft the upper section 38 of which has fixed thereto a bevel gear 39 which meshes with a bevel gear 40 fixed to a stud shaft 41. This stud shaft 41 is mounted in suitable bearings in the frame 10 and it has fixed thereto a gear 42 which meshes with a gear 43 fixed to a worm shaft 44, the worm 45 of which meshes with a segmental rack 46 carried by the drill shell 9. The shaft 41 may be provided with a crank handle 47 for use in manually swinging the drill when so desired.

The means for feeding motive power to the drill and to the motor hereinabove described has not been illustrated herein as it is not thought that it is necessary for a clear understanding of the invention and for the reason that it forms no part of the present invention.

One method of operation is as follows. The drill tools for cutting the first stage toward the lower level are secured in position for use. The clutch 28 is then moved into position to connect the motor shaft 29 with the truck drive. The motor is then started and the drill is also put into operation, thus moving the machine along its track and causing the drill to cut a channel to a predetermined point. When the machine reaches said predetermined point denoted in broken lines at $a$ in Fig. 3, the clutch 28 is thrown into position to disconnect the truck drive and to connect the motor shaft 29 to the drill swinging mechanism. This will cause the motor under the control of the handle 6, to swing the drill in the arc of a circle for completing the channel from said predetermined point $a$ to the point $a'$. The truck may then be moved back to its original position. After the cutting of the first stage has been completed, the next set of drill tools may be inserted ready for cutting the next stage to the lower level. The operations may then be repeated at the different stages $b b'$, $c c'$, $d d'$, until the machine has cut to the predetermined lower level $e f$. After this level has been reached, the machine when used as a radial cutter, may cut out the rock by a series of operations as shown in dotted lines beginning with $e e'$ to extend the level $e f$ to the limit of the cut at $f$.

It will be seen that the concentric guides in the frame for the upper and lower segments of the drill shell serve to materially brace the shell and produce a strong and rigid construction. It will also be seen that the extensible and contractible connection in the drill swinging mechanism permits the frame 10 to be adjusted into any angular position with respect to the truck without interfering with the operation of the engine or drill.

If so desired the drill shell may be locked to the truck frame when the machine is being used as a straight line channeler and released when used as a radial cutter. Also the truck may be clamped to the track rails when the machine is used as a radial cutter.

What I claim is:

1. A channeler comprising a wheeled truck, a drill pivoted thereon and a common motor, means for moving the truck to cause the drill to cut a channel to a predetermined point, means for swinging the drill in the arc of a circle to cause the drill to complete the channel from said predetermined point and means for connecting the motor with the truck moving means or with the drill swinging means at will.

2. A channeler comprising a wheeled truck, a drill pivoted thereon and a common motor mounted on the truck, means for moving the truck to cause the drill to cut a channel to a predetermined point, means for swinging the drill in the arc of a circle to cause the drill to complete the channel from said predetermined point and means for connecting the motor with the truck moving means or with the drill swinging means at will.

3. A channeler comprising a wheeled truck, a frame hinged thereto, a drill, its shell pivoted on the frame, means for adjusting the frame into different angular positions with respect to the truck, and a common motor, means for driving the truck to cause the drill to cut a channel to a predetermined point means for swinging the drill in the arc of a circle to cause it to complete the channel from said predetermined point and means for connecting the motor with the truck moving means or with the drill swinging means at will.

4. A channeler comprising a wheeled truck, a drill pivoted thereon, a motor, a truck driving mechanism, a drill swinging mechanism and means for connecting the motor to the one or the other of the said mechanisms at pleasure.

5. A channeler comprising a wheeled truck, a drill pivoted thereon, a motor mounted on the truck, a truck driving mechanism, a drill swinging mechanism and means for connecting the motor to the one or the other of the said mechanisms at pleasure.

In testimony, that I claim the foregoing as my invention, I have signed my name in presence of two witnesses, this 28th day of December 1906.

WILLIAM PRELLWITZ.

Witnesses:
 WARD RAYMOND,
 ARTHUR H. GIBSON.